United States Patent [19]

Schoch et al.

[11] Patent Number: 4,639,594
[45] Date of Patent: Jan. 27, 1987

[54] FIBEROPTIC PROBE AND METHOD OF MAKING AND USING

[75] Inventors: Stephen A. Schoch, Clay; Howard W. Sibley, Baldwinsville, both of N.Y.

[73] Assignee: Carrier Corporation, Syracuse, N.Y.

[21] Appl. No.: 682,504

[22] Filed: Dec. 17, 1984

[51] Int. Cl.⁴ .............................................. H01J 5/16
[52] U.S. Cl. ...................................... 250/227; 356/133
[58] Field of Search ................ 250/227, 577; 340/619; 356/133, 136

[56] References Cited

U.S. PATENT DOCUMENTS

| 4,152,075 | 5/1979 | Rellstab et al. | 356/435 |
| 4,156,149 | 5/1979 | Vaccari | 250/577 |
| 4,564,292 | 1/1986 | Omet | 356/133 |

*Primary Examiner*—Eugene R. LaRoche
*Assistant Examiner*—J. C. Lee
*Attorney, Agent, or Firm*—David J. Zobkiw

[57] ABSTRACT

A fiberoptic probe for in situ sensing of liquid level, concentration and/or phase change contains the optical and electrical components as well as a reference fluid so that the components are at the temperature of the fluid to be monitored. A reference fiber is located in the reference fluid which is sealed in the probe so that volatile reference fluids can be used.

10 Claims, 7 Drawing Figures

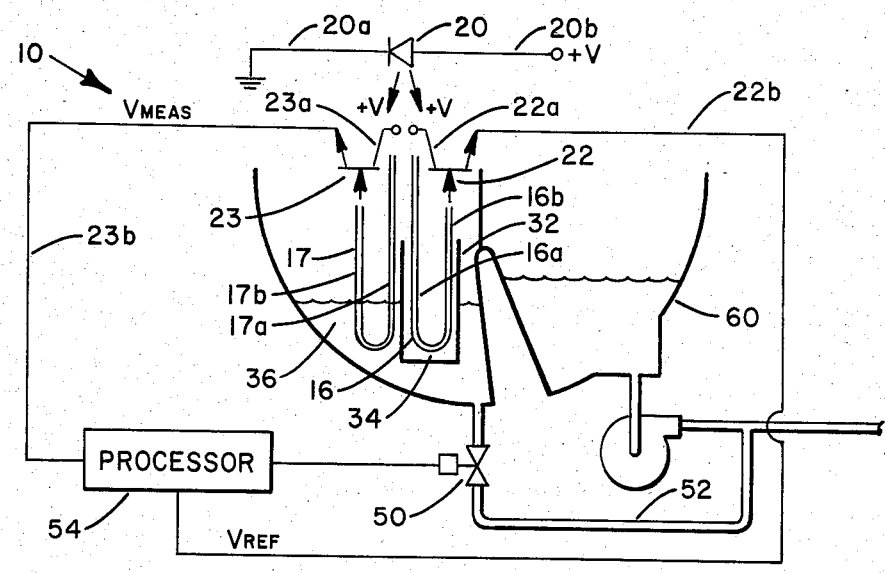
FIG. 7
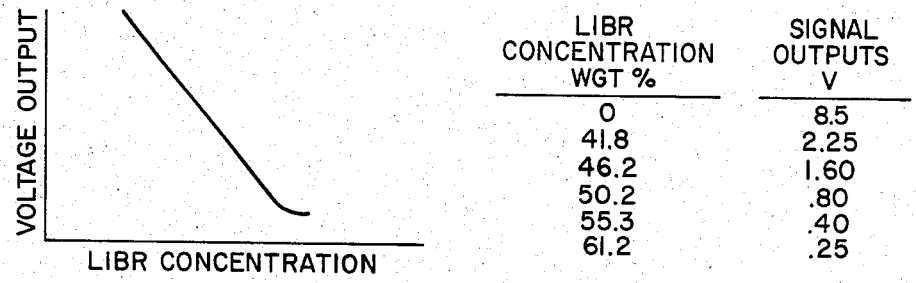
FIG. 6
| LIBR CONCENTRATION WGT % | SIGNAL OUTPUTS V |
|---|---|
| 0 | 8.5 |
| 41.8 | 2.25 |
| 46.2 | 1.60 |
| 50.2 | .80 |
| 55.3 | .40 |
| 61.2 | .25 |
FIG. 5
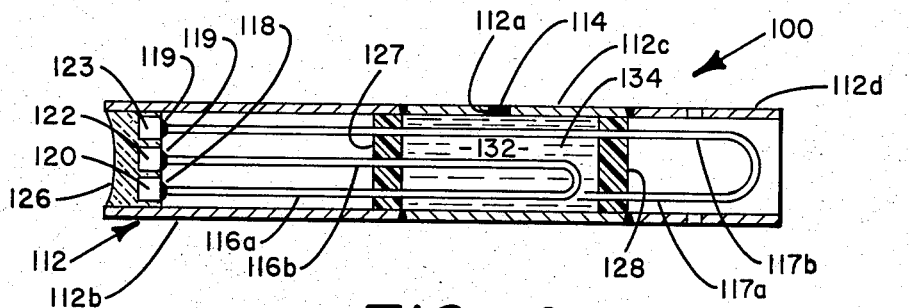
FIG. 4

FIBEROPTIC PROBE AND METHOD OF MAKING AND USING

BACKGROUND OF THE INVENTION

Optical fibers have been employed in a large number of applications including communications and sensors. One property of optical fibers that has been used in the various applications is that of total internal reflection whereby light is guided along optical fibers. Total internal reflection occurs when light in a transparent medium strikes the boundary of a material with a lower refractive index at a shallow enough angle and is totally reflected back into the material with the higher refractive index. Otherwise, the light passes through the boundary. Cladding has been employed to control the refractive index of the material contacting the surface of the fiber as well as to provide a reflecting surface. As the diameter of a fiber is quite small, the light entering the fiber at a proper angle for passage through the fiber is in a very narrow beam and might be considered as a quasi-coherent. As such, the light will pass through a straight section of unclad fiber with no significant losses due to the lack of cladding. Bends and loops are the source of the major losses.

Thus, as long as a fiber is surrounded by a medium, such as air, with a low refractive index, it reflects light. When a higher index liquid contacts it, it destroys the condition necessary for total internal reflection and light leaks out. This condition of light leakage is most significant at a bend or loop. One conventional application is liquid level sensing where the liquid level raises up to or drops below the fiber and, thereby, changes the light transmission through the fiber. Another application is refractive index determination where a reference probe is used in addition to the monitoring probe and the outputs are compared to determine the refractive index determination. The refractive indices of some materials such as liquid refrigerants are temperature dependent and, additionally, the liquid refrigerants are volatile.

SUMMARY OF THE INVENTION

A fiberoptic sensor is made in the form of a probe which is generally cylindrical and has a diameter of one-half inch, or less. The probe contains two U-shaped or hairpinned fibers with one fiber located entirely within a sealed chamber containing a reference fluid and the other fiber extending through the sealed chamber into a shielded area where it can be exposed to the environment to be tested. The light source is an LED and the detectors are photomultipliers, all of which are located in the probe so that all of the components are located in the environment to be tested and are, therefore, at the same temperature. Because the reference of fluid can be contaminated by exposure and, in the case of liquid refrigerant is volatile, the reference liquid must be sealed.

In making the probe a fiberglass tube having an outside diameter of about one-half inch is used as the sheath. The electronic components and optical fibers are located within the sheath such that the electronic components are sealed from the environment, the reference fiber is sealed within a chamber and the monitoring fiber extends through the sealed chamber to a portion of the tube which permits exposure to the environment but affords a shield from mechanical hazards such as are likely to damage the sensor. A small hole is then made through the sheath into the sealed chamber, or was made previously, and chilled reference fluid is injected into the chamber with a hypodermic syringe and, while the reference fluid is still cold, the hole is sealed with epoxy. The reference fluid is chilled so that the fluid vapor pressure is below one atmosphere. The probe is then calibrated.

It is an object of this invention to provide a probe suitable for sensing liquid level, concentration and phase change.

It is another object of this invention to provide a probe and the method of making it such that all of the components are maintained at the same temperature.

It is a further object of this invention to provide a probe with temperature compensation and hardware variation compensation.

It is another object of this invention to provide a probe which is not position sensitive for monitoring the concentration of a liquid.

It is an additional object of this invention to provide a probe suitable for determining concentration or the presence of a substance and for providing an output for controlling the concentration or presence of the substance.

It is another object of this invention to provide a sensor suitable for determining concentration to within ±0.25%. These objects, and others as will become apparent hereinafter, are accomplished by the present invention.

Basically, an optical-electronic light guide sensing system is located within a tubular sheath. All of the components are protected from the environment with the exception of the curved portion of the monitoring fiber. Reference fluid is sealed within the probe such that the reference fiber is exposed to the reference fluid. A single LED and two photomultipliers are located within the probe such that all of the components are at the same temperature. The outputs of the photomultipliers are compared to determine concentration and the resultant output can be used as a measure or used as a control signal to adjust the concentration.

BRIEF DESCRIPTION OF THE DRAWINGS

For a fuller understanding of the present invention, reference should now be made to the following detailed description thereof taken in conjunction with the accompanying drawings wherein:

FIG. 4 is a sectional view of a second embodiment of the probe;

FIG. 5 is a chart showing the signal output in volts for various concentrations of lithium bromide;

FIG. 6 is a graph of LiBr concentration vs. voltage output; and

FIG. 7 is a schematic diagram of the invention when used to monitor and control LiBr concentration.

DESCRIPTION OF THE PREFERRED EMBODIMENTS

Figure 1:
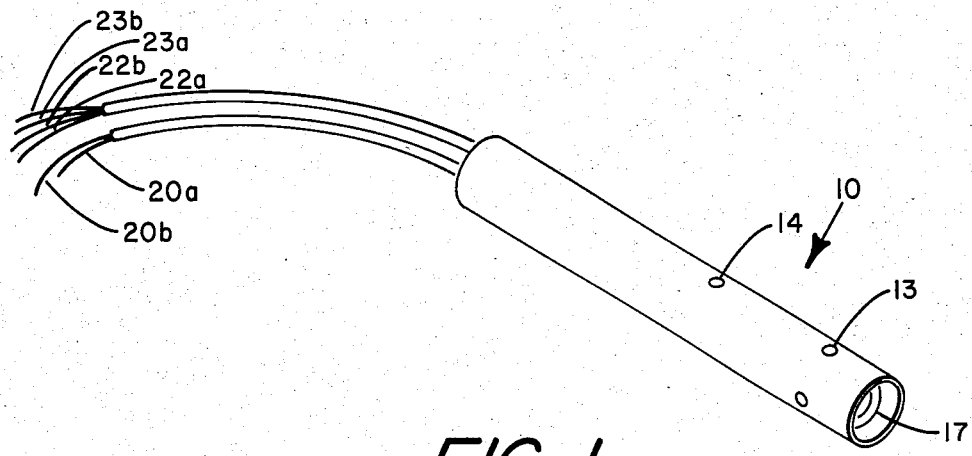
FIG. 1 is a pictorial view of the probe.
Figure 2:
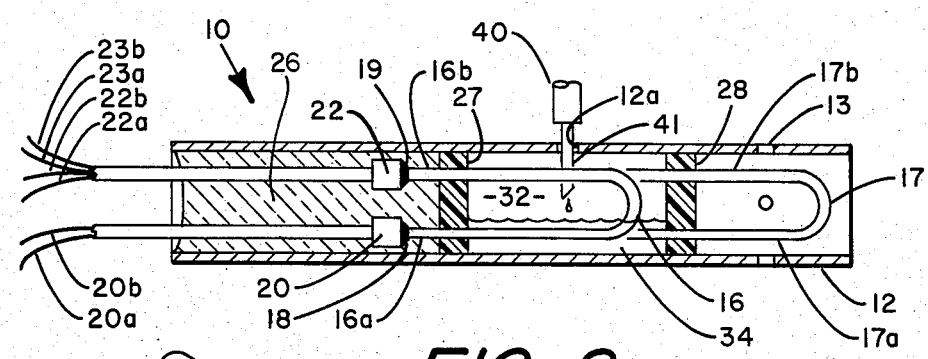
FIG. 2 is a longitudinal section of the probe showing the charging of the sealed chamber.

In FIGS. 1 and 2, the numeral 10 generally designates the probe. Probe 10 includes a tubular fiberglass sheath 12 having a plurality of holes 13 formed therein and an epoxy patch 14 thereon. Located within sheath 12 are U- or hairpin shaped optical fibers 16 and 17 with fiber 16 being shorter and serving as a reference. The fibers are preferably quartz with a 2 mm. diameter with a 3-4 mm. bend radius. An LED 20 is located within sheath 12 and is bonded to fibers 16 and 17 such that it can supply light to the ends of legs 16a and 17a respectively of fibers 16 and 17. LED is secured to the fibers by an epoxy bond with the epoxy having a refractive index equal to or greater than that of the fibers 16 and 17 to avoid light loss. At the ends of legs 16b and 17b are located photomultipliers 22 and 23, respectively, which are bonded thereto with epoxy bonds 19 having the same optical properties as bonds 18 and which detect the light transmitted through fibers 16 and 17, respectively. Holding the components in place within the sheath 12 and sealing the components from contacting the test medium are epoxy seal 26 and fiberglass disks 27 and 28 which are epoxy sealed in place. The epoxy used for seal 26 and to seal disks 27 and 28 is Epo-Tek 320, or its equivalent, which is resistant to most halocarbon refrigerants. Thus, epoxy seal 26 and disk 27 together with sheath 12 seal LED 20 and photomultipliers 22 and 23 from the environment. Similarly, epoxy seal 27 and 28 together with sheath 12 define a sealed chamber 32 containing reference fluid 34. Reference fluid may be a mixture such as a 54% LiBr solution, a refrigerant such as R11, an ethylene glycol brine solution or any other suitable reference fluid.

Figure 3:
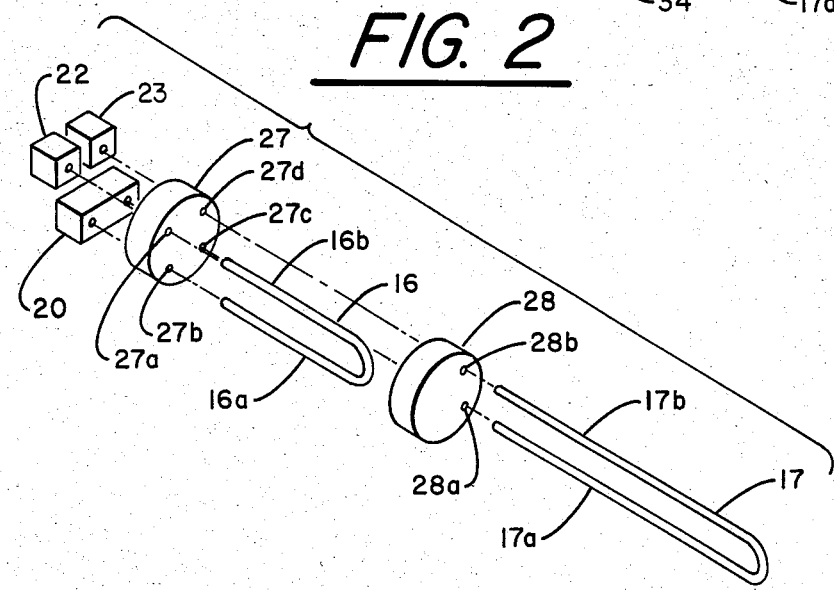
FIG. 3 is an exploded view of a portion of the probe.

Referring now specifically to FIG. 2, it will be seen that a hole 12a is either formed in sheath 12 prior to assembly of the probe 10 or after its assembly. Preferably, as best shown in FIG. 3, a subassembly 11 is put together and placed in sheath 12. Specifically, legs 16a and b of fiber 16 are inserted through holes 27b and a of disk 27. Legs 17a and b of fiber 17 are inserted through holes 28a and b of disk 28 which is slid down the legs for the proper distance. Legs 17a and b are then inserted through holes 27c and d, respectively of disk 27. The holes 28a and b and 27a-d are then sealed with epoxy to prevent leakage therethrough. LED 20 is secured in place on disk 27 with epoxy bond 18 so as to supply light to the ends of legs 16a and 17a. Photomultipliers 22 and 23 are secured in place on seal 27 with epoxy bonds 19 so as to receive the light passing from legs 16b and 17b, respectively. Subassembly 11 is then positioned in sheath 12. Seals 27 and 28 are sealed to the sheath 12 by epoxy. The ends of sheathed wires 20a and b, 22a and b and 23a and b and LED, and photomultipliers 22 and 23 to which they are attached are sealed from the environment and in sheath 12 by epoxy seal 26.

The fibers 16 and 17 and the reference fluid 34 are selected such that the refractive index of the fluid is less than that of the fiber but the closer the indices are, the better, since it produced a more linear response. Assuming that a volatile fluid such as the refrigerant R11 is to be placed in chamber 34, the R11 is chilled below room temperature and hypodermic syringe 40 is filled with the chilled R11. The needle 41 of hypodermic syringe 40 is inserted through hole 12a and the R11 is injected into chamber 32 until it is filled with the R11. Hole 12a is then sealed with epoxy patch 14. Chamber 32 is then isolated from the surrounding medium as are LED 20 and photomultipliers 22 and 23. Within normal manufacturing tolerances, variation from probe to probe should be expected, requiring that calibration curves be generated for each probe. For non-aqueous solutions of volatile organic materials, calibration is obtained by insertion of the probe into an infrared flow cell connected to a computer-operated data station in which a Lambert-Beer matrix inversion has been programmed.

Referring now to FIG. 4, a modified probe 100 is illustrated which differs from probe 10 in its method of assembly. The fiberglass sheath 112 is formed in three sections 112b, c and d, respectively. LED 120 is epoxied to legs 116a and 117a of fibers 116 and 117 by epoxy bond 118 and photomultipliers 122 and 123 are epoxied to legs 116b and 117b by epoxy bonds 119. Epoxy bonds 118 and 119 have a refraction index equal to or greater than that of fibers 116 and 117 to avoid light loss. The LED 120, photomultipliers 122 and 123 and fibers 116 and 117 are epoxied in place in section 112b by epoxy seal 126. Fibers 116 and 117 are additionally sealed to sheath section 112b by epoxy seal 127 which also serves to bond sheath section 112c to sheath section 112b. Fiber 117 is sealed to sheath 112c by epoxy seal 128 which defines a portion of chamber 132 as well as sealing sheath section 112d to section 112c. Chamber 132 will be filled with reference fluid 134 via hole 112a which will be subsequently sealed by epoxy patch 114.

When the probe 10 or 100 has been calibrated, it can then be placed in a circuit such as that illustrated in FIG. 7 which illustrates an absorption machine 60. The fluid 34, which is the fluid in chamber 32, may, for example, be 54% lithium bromide solution, as illustrated, a refrigerant such as R11, a mixture such as an ethylene glycol brine solution or any other suitable reference fluid. The fluid to be tested, 36, can be the LiBr solution for the absorber or evaporator of an absorption machine, as illustrated, an ethylene glycol brine solution of a thermal storage system or some other suitable fluid. A single probe can be used for determining concentration and phase change assuming that the probe location is representative of the whole system. The thin tubular configuration of the probes 10 and 100 make them particularly suitable for insertion in refrigeration systems and makes them position insensitive for concentration monitoring. For liquid level determination, however, multiple probes are ordinarily used since an individual probe provides no information as to how far below or above the probe the liquid level is located. A probe at the extremes of the acceptable liquid level range would ordinarily be the minimum number of probes used for liquid level monitoring. Within the probe 10 is located all of the probe structure which is in, and therefore at this same temperature as, the fluid to be tested 36.

FIG. 6 is a graph of the measured LiBr concentration vs. voltage output shown in the chart of FIG. 5. Assuming that liquid 36 represents the LiBr solution in an absorber of an absorption machine 60 and solenoid valve 50 controls the water line 52 leading to the absorber for controlling the concentration of the LiBr, the present invention provides a more accurate control. Conventionally, two sets of level float controls indirectly estimate the LiBr concentration by high and low refrigerant sensing in the evaporator. At high refrigerant levels which corresponds to high solution concentration, a float with a magnet moves over a reed switch closing its contacts and energizing a solenoid valve that allows refrigerant to be pumped back to the LiBr solution and diluting it. Because of the indirect detection, there is a considerable safety factor built in relative to LiBr crystallization margin. Since for each pound of non-useful water added to the LiBr by this system requires approximately 1,000 BTU's of energy expanded in the generator to remove it, a smaller margin is desirable.

The output of LED 20 enters the ends of legs 16a and 17a of fibers 16 and 17, respectively. Depending upon the indices of refraction of liquids 34 and 36 relative to the index of refraction of fibers 16 and 17, respectively, there will be some loss of light in passing through fibers 16 and 17. The light passing through fibers 16 and 17 will strike photomultipliers or detectors 22 and 23, respectively. The pulsing light striking detectors 22 and 23 results in electrical outputs $V_{REF}$ and $V_{MEAS}$, respectively, which are supplied to processor 54. Processor 54 determines the differences in voltages $V_{MEAS}$ and $V_{REF}$ and provides a control signal to control solenoid valve 50. Because, as shown in FIG. 6, the concentration vs. voltage output for LiBr is essentially linear, it is possible to more accurately control the LiBr concentration to increase the efficiency of the system.

Although preferred embodiments of the present invention have been illustrated and described, other changes will occur to those skilled in the art. For example, thermal storage fluids or cooling tower water can be monitored and/or controlled. It is, therefore, intended that the present invention is to be limited only by the scope of the appended claims.

What is claimed is:

1. A fiberoptic probe for in situ sensing of a fluid condition by immersion therein comprising:
   a tubular sheath;
   a reference fluid sealed within a first chamber in said sheath;
   a first U-shaped fiber within said first chamber so as to be isolated from the fluid to be sensed;
   a second U-shaped fiber extending through said first chamber so as to contact the fluid to be sensed;
   an LED positioned in said sheath so as to direct light into said first and second U-shaped fibers;
   a first detector means in said sheath for detecting light passing through said first U-shaped fiber; and
   a second detector means in said sheath for detecting light passing through said second U-shaped fiber.

2. The fiberoptic probe of claim 1 further including means for determining the differences in light passing through said first and second U-shaped fibers.

3. A control circuit comprising:
   (a) a fiberoptic probe for in situ sensing of a fluid condition by immersion therein including:
      a tubular sheath;
      a reference fluid sealed within a first chamber in said sheath;
      a first U-shaped fiber within said first chamber so as to be isolated from the fluid to be sensed;
      a second U-shaped fiber extending through said first chamber so as to contact the fluid to be sensed;
      an LED positioned in said sheath so as to direct light into said first and second U-shaped fibers;
      a first detector means in said sheath for detecting light passing through said first U-shaped fiber;
      a second detector means in said sheath for detecting light passing through said second U-shaped fiber;
   (b) means for determining the differences in light passing through said first and second U-shaped fibers; and
   (c) control means responsive to said means for determining the differences.

4. The fiberoptic probe of claim 3 wherein said control means is a solenoid valve means controlling a water line feeding water to the absorber of an absorption refrigeration machine.

5. The fiberoptic probe of claim 1 further including means sealing said LED and said first and second detector means from the environment.

6. A method of making a fiberoptic probe for in situ sensing of a fluid condition comprising the steps of:
   inserting the two ends of a first U-shaped fiber into a first disk;
   inserting the two ends of a second U-shaped fiber through a second disk and then into the first disk whereby the first U-shaped fiber is between first and second disks;
   positioning a LED to supply light to a first end of the first and second fibers;
   positioning a first detector to detect light passing through the first fiber;
   positioning a second detector to detect light passing through the second fiber;
   placing the first and second disks, the first and second fibers, the LED, and the first and second detectors within a sheath;
   sealing the first and second disks to the sheath whereby a chamber is formed within the sheath;
   filling the chamber with a reference fluid; and
   sealing the reference fluid within the chamber.

7. The method of claim 6 further including the step of sealing the LED and first and second detectors within the sheath.

8. The method of claim 6 wherein the steps of positioning the LED and first and second detectors comprises epoxying the LED and first and second detectors to the first and second fibers with an epoxy having a refractive index which is equal to or greater than that of the first and second fibers.

9. A method of making a fiberoptic probe for in situ sensing of a fluid condition comprising the steps of:
   epoxying an LED to a end of two U-shaped fibers;
   epoxying a photomultiplier to each of the other ends of the U-shaped fibers;
   epoxying the LED, photomultipliers and fibers in place in a first section of a sheath so that the bends of the fibers extend therefrom;
   attaching a second section of the sheath to the first section of the sheath so that the bend of a first fiber is within the second sheath section;
   epoxying the second fiber to the second sheath section so as to form a chamber within the second sheath section;
   attaching a third section of the sheath to the second section of the sheath so that the bend of the second fiber is within the third sheath section;
   filling the chamber with a reference fluid; and
   sealing the reference fluid within the chamber.

10. A method of sensing a property of a lithium bromide solution in an absorption refrigeration machine comprising the steps of:
    placing a probe including a reference lithium bromide solution, a first optical fiber within be reference solution and a second optical fiber into a lithium bromide solution which is to be monitored so that the second optical fiber can contact the solution to be monitored;
    from a single light source within the probe, sending a light signal through the first and second fibers;
    detecting the light passing through each of the fibers;

determining the difference in the amount of light passing through each of the fibers due to the light signal;

producing a signal representing the difference in the amount of light passing through the fibers; and controlling the solution to be monitored responsive to the signal representing the difference in the amount of light passing through the fibers.

* * * * *